US008506382B2

(12) United States Patent
Schultz et al.

(10) Patent No.: US 8,506,382 B2
(45) Date of Patent: Aug. 13, 2013

(54) SLOT MACHINE GAME FOR TWO PLAYERS

(75) Inventors: David Schultz, Henderson, NV (US); Keith Kruczynski, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 598 days.

(21) Appl. No.: 12/797,442

(22) Filed: Jun. 9, 2010

(65) Prior Publication Data

US 2011/0287824 A1 Nov. 24, 2011

Related U.S. Application Data

(63) Continuation-in-part of application No. 12/784,325, filed on May 20, 2010, now abandoned.

(51) Int. Cl.

| | |
|---|---|
| ***A63F 13/00*** | (2006.01) |
| ***A63F 3/00*** | (2006.01) |
| ***A63F 13/10*** | (2006.01) |
| *A63F 13/08* | (2006.01) |

(52) U.S. Cl.

USPC .......... 463/20; 463/1; 463/6; 463/16; 463/46; 273/236; 273/237; 273/242; 273/243

(58) Field of Classification Search

USPC ............... 463/6, 20, 46, 1, 16; 273/236, 237, 273/242, 243

See application file for complete search history.

(56) References Cited

U.S. PATENT DOCUMENTS

| | | | | |
|---|---|---|---|---|
| 4,527,798 | A * | 7/1985 | Siekierski et al. | 463/17 |
| 4,621,814 | A * | 11/1986 | Stepan et al. | 463/46 |
| 5,332,076 | A * | 7/1994 | Ziegert | 194/217 |
| 5,560,603 | A * | 10/1996 | Seelig et al. | 463/6 |
| 5,611,730 | A * | 3/1997 | Weiss | 463/20 |
| 5,826,882 | A * | 10/1998 | Ward | 273/309 |
| 6,409,172 | B1 * | 6/2002 | Vancura | 273/256 |
| 6,508,707 | B2 * | 1/2003 | DeMar et al. | 463/16 |
| 6,726,562 | B2 * | 4/2004 | Vancura | 463/20 |
| 6,860,810 | B2 * | 3/2005 | Cannon et al. | 463/20 |
| 6,942,574 | B1 * | 9/2005 | LeMay et al. | 463/41 |
| 6,986,711 | B2 * | 1/2006 | Vancura | 463/20 |
| 7,137,884 | B2 * | 11/2006 | Gilmore | 463/16 |
| 7,361,089 | B2 * | 4/2008 | Daly et al. | 463/20 |
| 7,452,271 | B2 * | 11/2008 | DeMar et al. | 463/20 |
| 7,465,226 | B2 * | 12/2008 | Ikeya et al. | 463/16 |
| 7,815,503 | B2 * | 10/2010 | Walker et al. | 463/20 |
| 8,113,947 | B2 * | 2/2012 | Hornik et al. | 463/25 |
| 8,147,322 | B2 * | 4/2012 | Walker et al. | 463/25 |
| 8,292,723 | B2 * | 10/2012 | DeWaal | 463/20 |
| 2002/0016200 | A1 * | 2/2002 | Baerlocher et al. | 463/20 |
| 2003/0114219 | A1 * | 6/2003 | McClintic | 463/25 |
| 2003/0157978 | A1 * | 8/2003 | Englman | 463/16 |
| 2003/0181238 | A1 * | 9/2003 | DeMar et al. | 463/20 |
| 2003/0190947 | A1 * | 10/2003 | Baerlocher et al. | 463/20 |

(Continued)

FOREIGN PATENT DOCUMENTS

WO WO 2009052164 A1 * 4/2009

*Primary Examiner* — William H McCulloch, Jr.

(74) *Attorney, Agent, or Firm* — Marvin Hein

(57) ABSTRACT

Disclosed are two-player games, gaming machines, gaming systems and methods including one or more shared feature games. Each player has a respective base game, game board and a token movable on his game board in response to his base game outcomes. Certain combinations of token positions on the two game boards may trigger play of one or more feature games shared by the players.

6 Claims, 14 Drawing Sheets

(56) References Cited

U.S. PATENT DOCUMENTS

| | | | | |
|---|---|---|---|---|
| 2003/0190948 | A1* | 10/2003 | Baerlocher et al. | 463/20 |
| 2003/0199307 | A1* | 10/2003 | DeMar et al. | 463/20 |
| 2003/0199309 | A1* | 10/2003 | DeMar et al. | 463/20 |
| 2003/0224851 | A1* | 12/2003 | Gilmore | 463/20 |
| 2004/0106444 | A1* | 6/2004 | Cuddy et al. | 463/16 |
| 2004/0137978 | A1* | 7/2004 | Cole et al. | 463/16 |
| 2005/0003886 | A1* | 1/2005 | Englman et al. | 463/25 |
| 2005/0049048 | A1* | 3/2005 | Wilder et al. | 463/42 |
| 2005/0164762 | A1* | 7/2005 | Smith et al. | 463/16 |
| 2006/0121971 | A1* | 6/2006 | Slomiany et al. | 463/16 |
| 2007/0021180 | A1* | 1/2007 | Osawa | 463/16 |
| 2007/0021183 | A1* | 1/2007 | Fiden et al. | 463/17 |
| 2008/0125205 | A1* | 5/2008 | Inamura | 463/13 |
| 2008/0146309 | A1* | 6/2008 | Bennett | 463/18 |
| 2008/0274790 | A1* | 11/2008 | Cannon | 463/21 |
| 2009/0124320 | A1* | 5/2009 | DeWaal | 463/16 |
| 2010/0113122 | A1* | 5/2010 | Walker et al. | 463/16 |
| 2010/0197385 | A1* | 8/2010 | Aoki et al. | 463/27 |
| 2011/0111848 | A1* | 5/2011 | Brandstetter et al. | 463/31 |
| 2011/0111864 | A1* | 5/2011 | Englman et al. | 463/42 |
| 2011/0201410 | A1* | 8/2011 | Englman et al. | 463/25 |
| 2011/0230251 | A1* | 9/2011 | Nicely et al. | 463/20 |
| 2011/0237327 | A1* | 9/2011 | Baerlocher et al. | 463/30 |
| 2011/0263339 | A1* | 10/2011 | Cole et al. | 463/46 |
| 2011/0287824 | A1* | 11/2011 | Schultz et al. | 463/20 |
| 2012/0252566 | A1* | 10/2012 | Gagner et al. | 463/25 |

* cited by examiner

200

SLOT MACHINE GAME FOR TWO PLAYERS

CROSS-REFERENCE TO RELATED APPLICATIONS

This application is a continuation-in-part of U.S. patent application Ser. No. 12/784,325 filed on May 20, 2010, hereby incorporated by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is directed to wagering games, gaming machines, networked gaming systems and methods and, more particularly, to wagering games, gaming machines, networked gaming systems and methods having a slot machine game for two players including a shared feature game.

2. Description of the Related Art

In the prior art, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting. Feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

Some gaming machine games today include one or more progressive prize awards. In some configurations, the progressive prize may have a small probability of a player winning it; thus making it possible to have a larger progressive prize. In other game configurations, the progressive prize may be a small amount; thus allowing the player patron to win the progressive prize more frequently. In most typical game configurations, the player wins the progressive prize as a result of a specific game outcome within the primary or main game.

Gaming machines have traditionally been under the control of a single player. While single-player gaming machines including feature games and progressive prizes have been very successful, there remains a need for games that provide a shared multi-player game experience.

SUMMARY OF THE INVENTION

In accordance with one embodiment of the invention, a gaming machine includes a processor and a game playable by each of a first and second player under control of the processor. Each of the games includes a plurality of indicia-bearing reels and a game board comprising a plurality of locations, the plurality of reels operable to display an outcome including a random display of their indicia. A token may be positioned at one of the plurality of locations of each game board in response to the respective game outcome. One or more feature games shared by both the first player and the second player may be triggered according to the positions of the tokens on two game boards.

In accordance with one or more embodiments of the invention, a wagering game for two players utilizes two different sets of reels with two separate "board games," each board game displayed around one of the reel sets. Various outcomes of spins of the two sets of reels cause a token on each of the players' respective game boards to advance to different positions on the board. At least some of the board positions are associated with prizes which may be won by the corresponding player. At least one board location is common to both boards. When both players' tokens land on that location, a common feature game is triggered.

In accordance with one embodiment of the invention, entitled Meet Me in the Middle, the reels include "advance" symbols that serve to move each player's token around the board. The board game consists of blank locations and award locations with a "Middle Jackpot" location shared between the two boards. There are two types of awards, simultaneous awards and individual awards. Simultaneous awards occur when both players land on like award locations. There are two types of simultaneous awards; free games and the middle jackpot.

Free games are awarded when both players' tokens land on a "Free Game" location at the end of reel spin. The includes the case in which one player was previously on a "Free Game" location and did not advance while the other player advanced their token and subsequently landed on a "Free Game" location.

The middle jackpot feature is likewise awarded when both players' tokens land on the common "Jackpot" location at the end of a reel spin. This too includes the case in which one player's token was previously on the "Jackpot" location and did not advance while the other player's token advanced and subsequently landed on the "Jackpot" location.

In one embodiment, once awarded, the same simultaneous award will not be immediately awarded again if neither token advances on the next spin. In alternate embodiments, the players may be awarded simultaneous awards repeatedly if their tokens do not advance.

Individual awards occur when one player's token lands on an award location at the end of a spin. An example embodiment offers three types of individual awards, two-times total win, three-times total win, and mystery awards. The two- and three-times total win awards multiply the total award won on the corresponding players' side. Note that it is possible for a player to have no winning outcome displayed on his reels, in which case he would receive no award despite his token having landed on a multiplying award location. In one or more embodiments, the mystery awards pay two-, three-, four-, or five-times total win, two- or three-times total bet, or automatically advance both players to the Middle Jackpot award location.

Other types of simultaneous or individual awards might include, but are not limited to: wild reels, pick-a-tile bonuses, alternate base games, poker games, keno games, roulette games, etc.

In one embodiment, once a player's token has landed on an individual award location, the same Individual Award will not be awarded again in the case that on the next spin following an Individual Award, the player does not advance their token. In alternate embodiments, the player might be awarded and Individual Award repeatedly if their token does not advance.

Other features and advantages will become apparent from the following detailed description, taken in conjunction with the accompanying drawings, which illustrate by way of example, the features of the various embodiments.

DETAILED DESCRIPTION OF THE EMBODIMENTS

Figure 1:
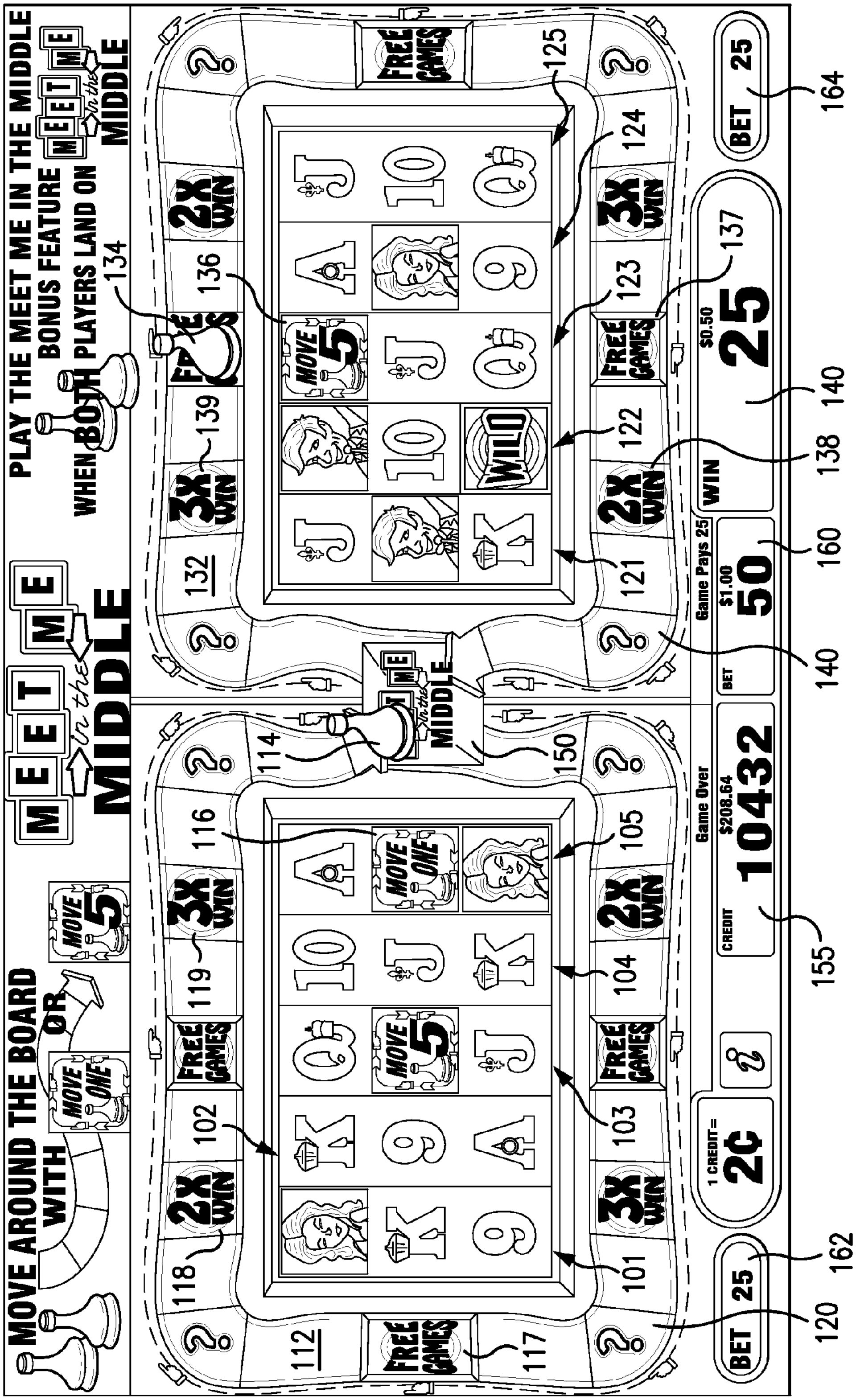
FIG. 1 is a display image associated with an example game in accordance with one or more embodiments.

Various embodiments are directed to a game, gaming machine, gaming networks and method for playing a game, wherein the game includes adjustable multi-part indicia. The embodiments are illustrated and described herein, by way of example only, and not by way of limitation. Referring now to the drawings, and more particularly to FIGS. 1-8, there are shown illustrative examples of games, gaming machines, gaming networks and methods for playing a game in accordance with various aspects of the invention.

Figure 2A:
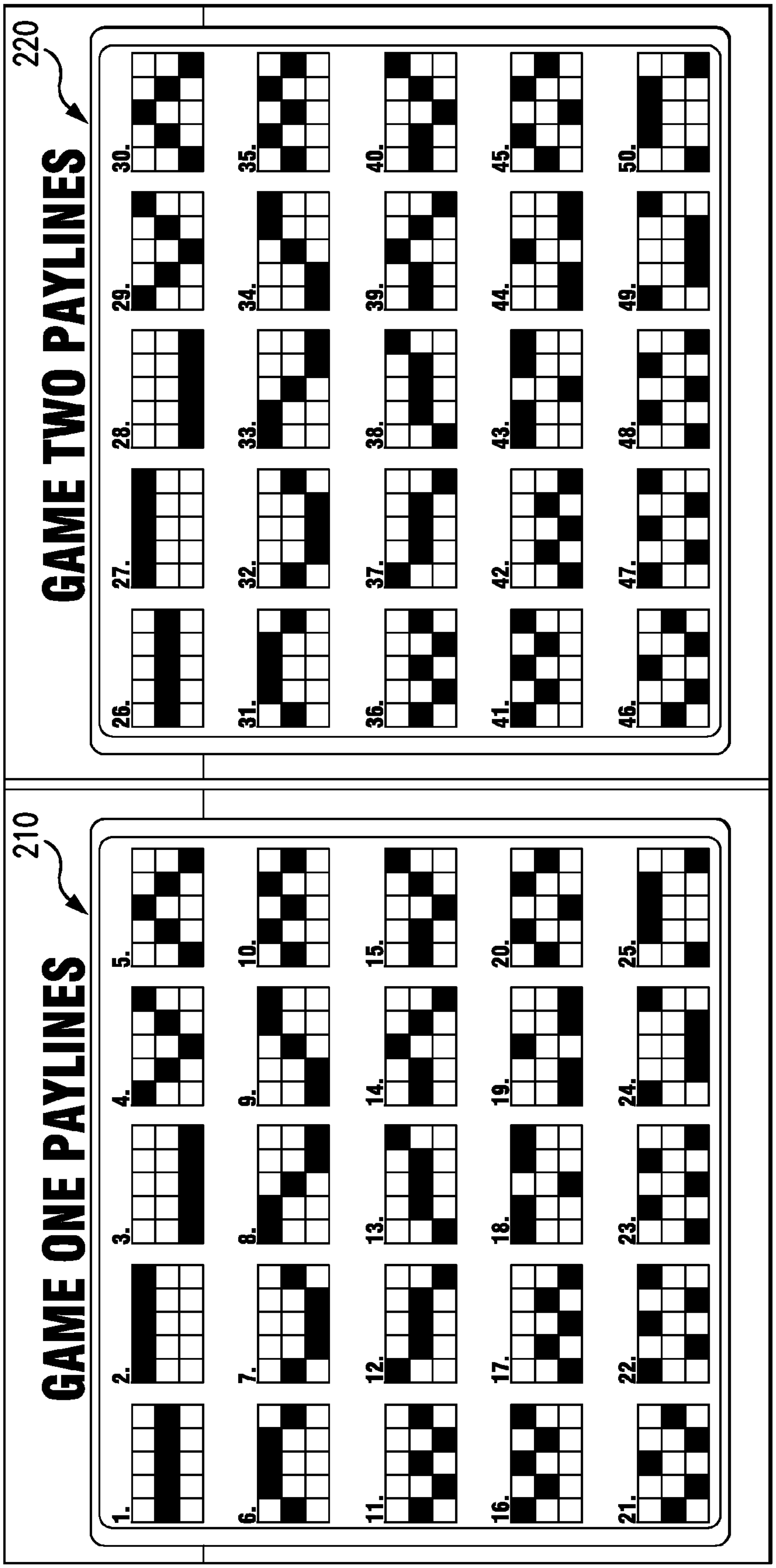
FIGS. 2A-2E illustrate the rules of a game in accordance with one or more embodiments.
Figure 2B:
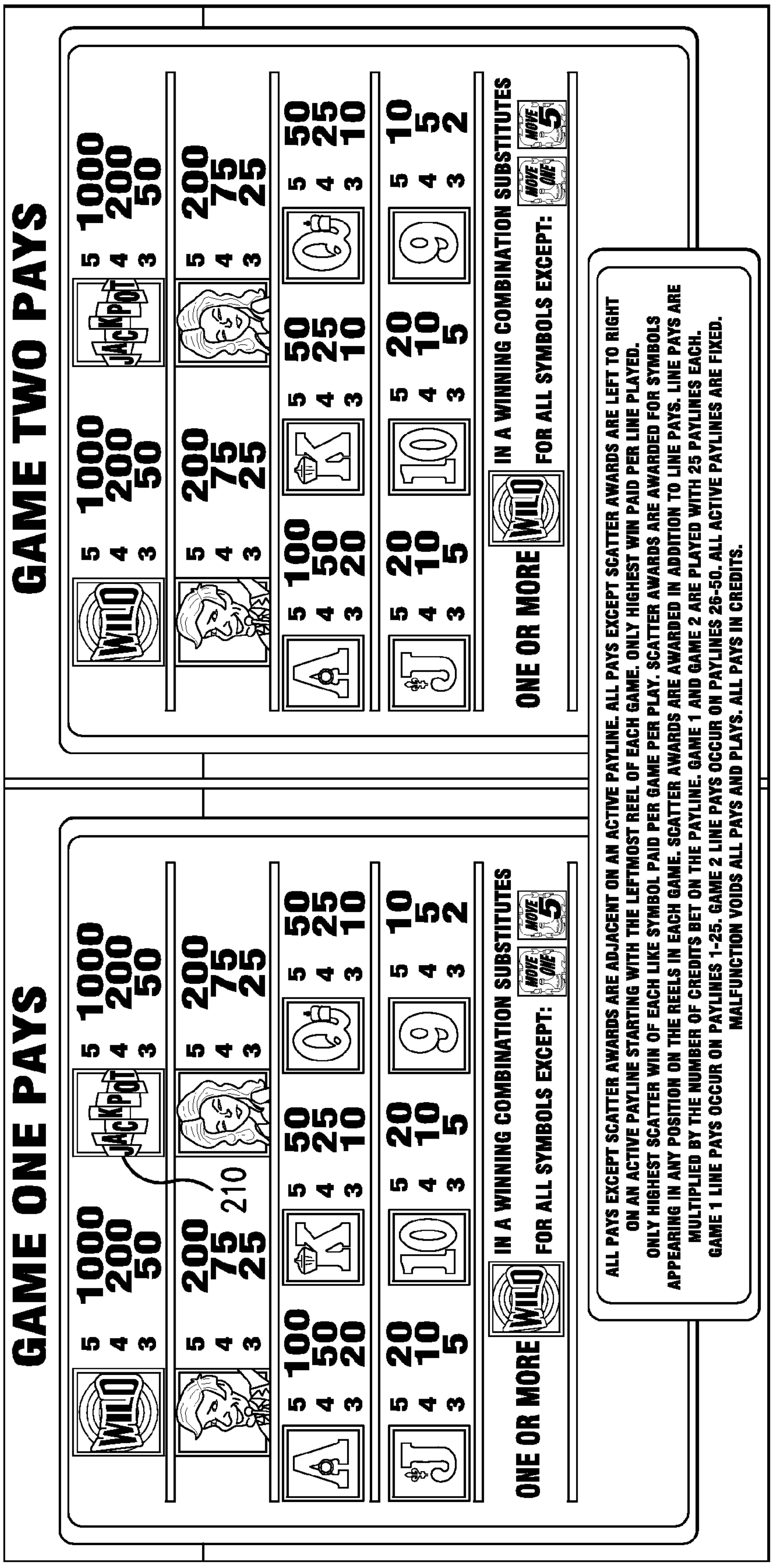
Figure 2C:
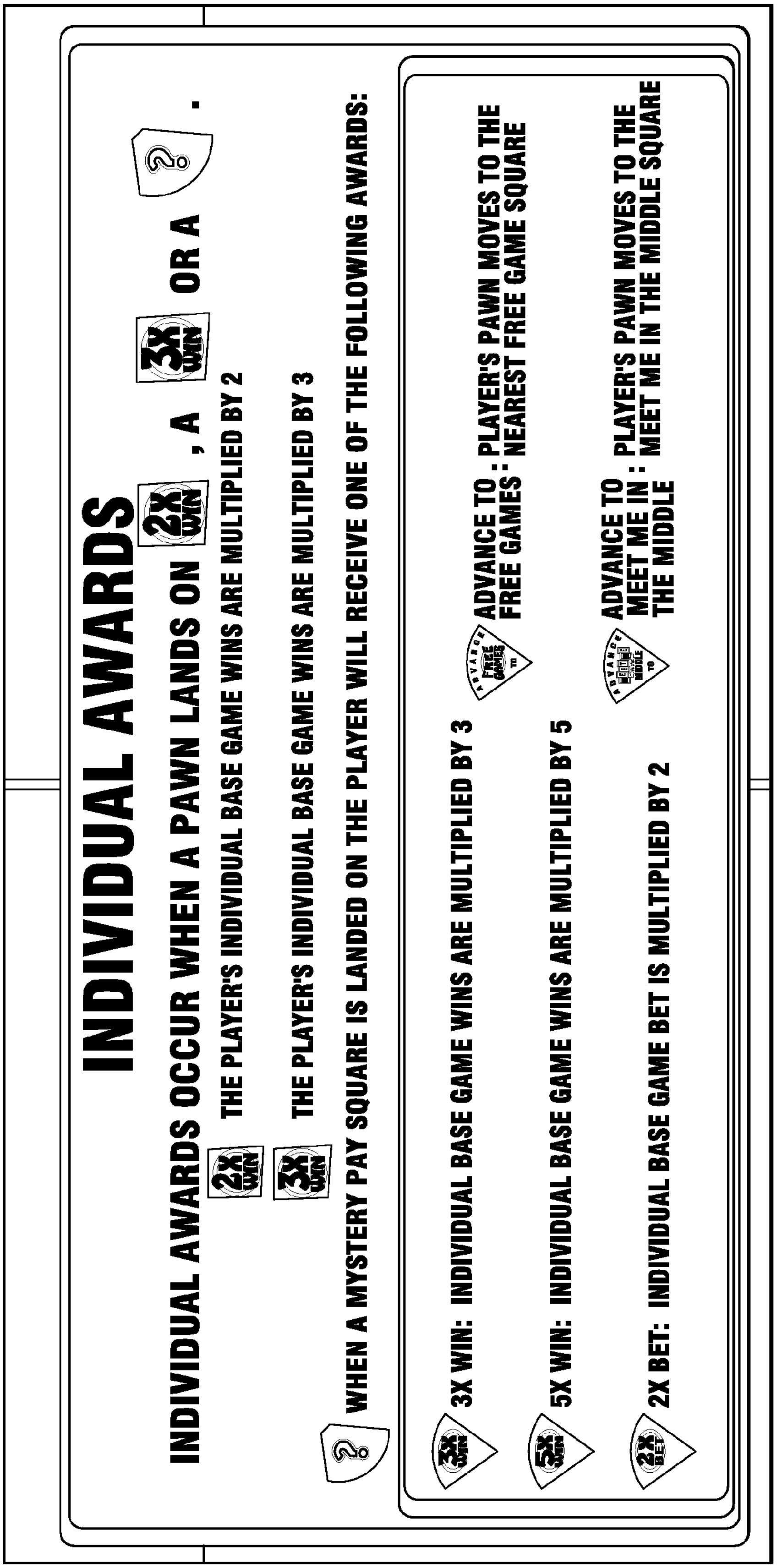
Figure 2D:
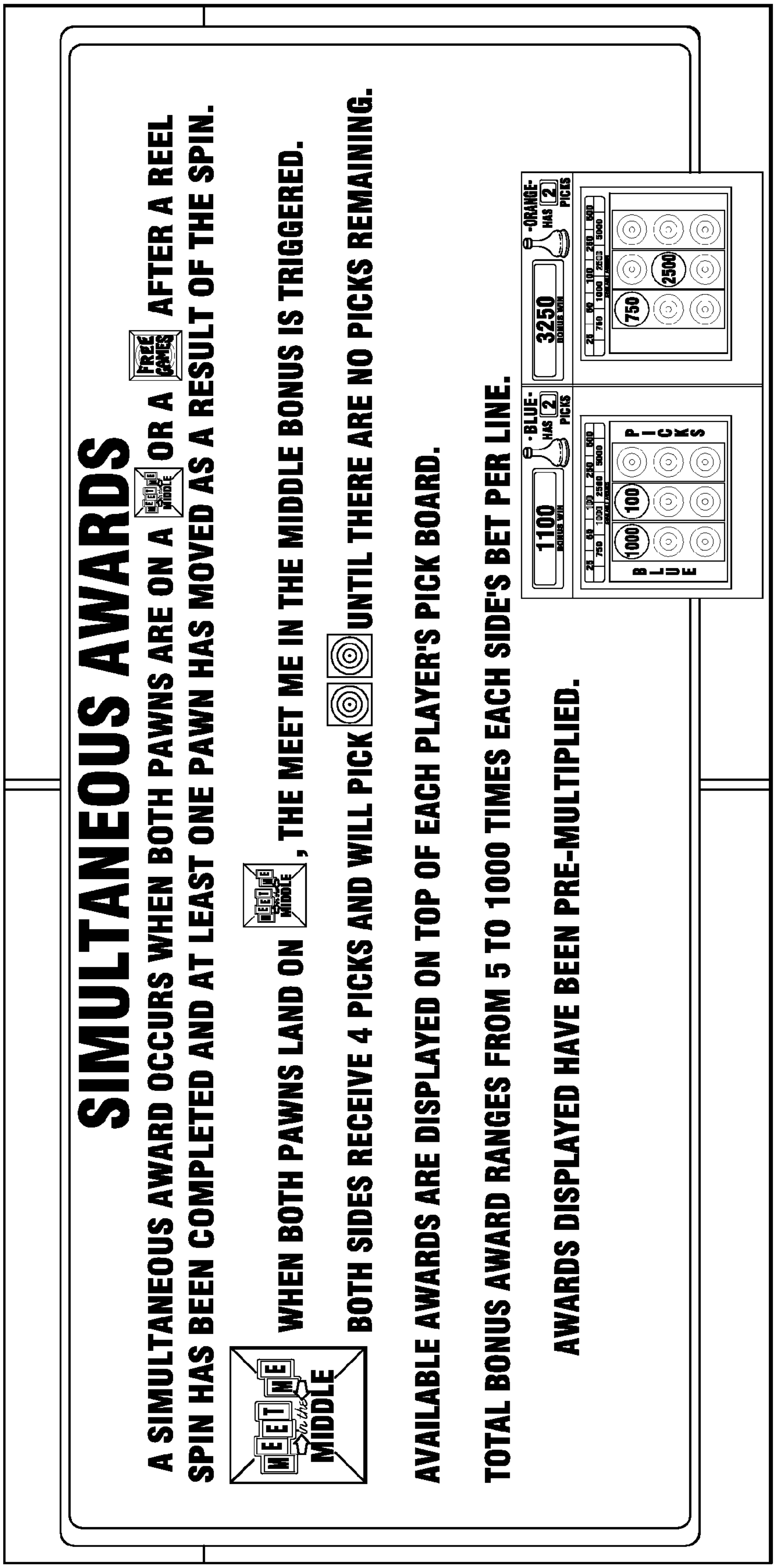
Figure 2E:
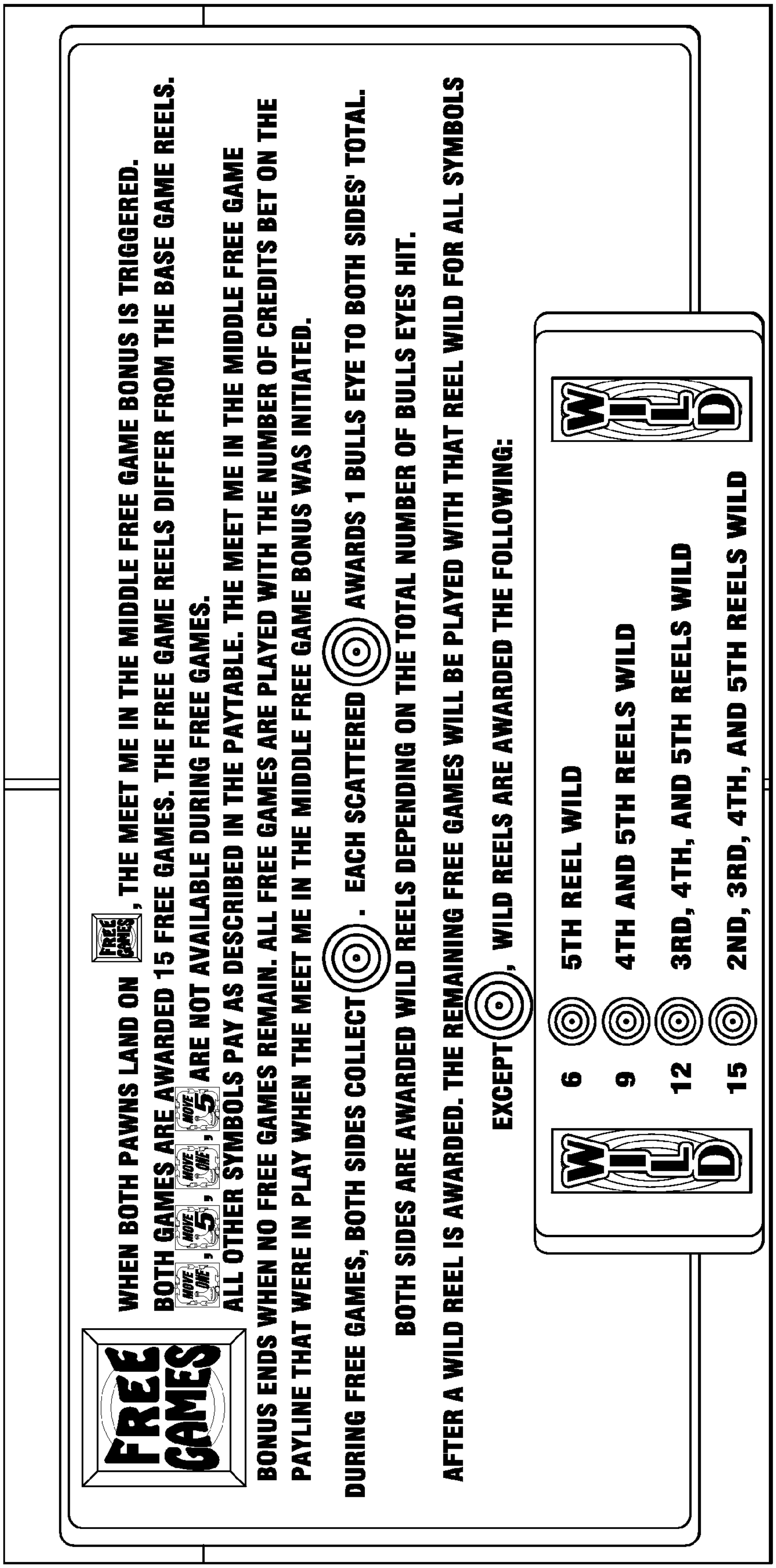
Figure 3:
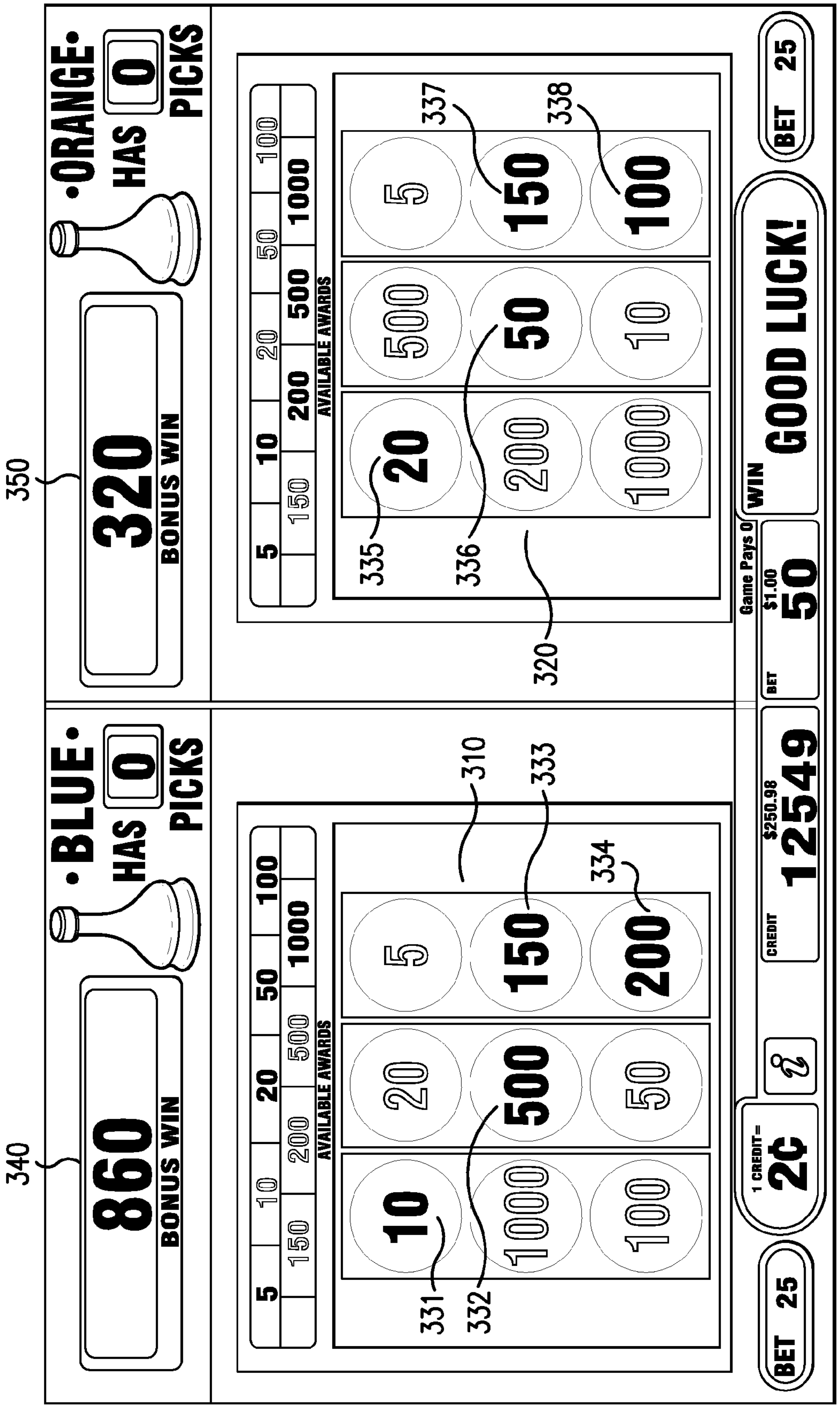
FIG. 3 illustrates a feature game in accordance with one or more embodiments.

An example game in accordance with one or more aspects of the invention is shown in FIGS. 1-3. Referring to FIG. 1, game 100 is implemented using two sets of spinning reels 101-105 and 121-125, each associated respectively with Game One 110 or Game Two 120. A set 210 and 220 of 25 pay line patterns per game, as illustrated by FIGS. 2A, 1-25 and 26-50, respectively, passes through one indicium on each of the five reels associated with a game. For example, pay line 1 of set 210 extends horizontally through the middle row of each of the five reels 101-105. The number of pay lines and their patterns are by way of example only and may vary.

Referring again to FIG. 1, the player of each game, Game One 110 or Game Two 120, selects a number of pay lines to play and a number of credits or coins to wager on each line using touch screen controls or gaming device control buttons. Win paid meter 140 and credit meter 155 provide the players with information about the amount paid by the last game played and the total number of credits available for play. BET meter 160 displays the total of the currently selected wagers 162 and 164 of both players. The players may collect the balance of the credits shown by credit meter 155 by pressing a collect button (not shown).

Figure 4:
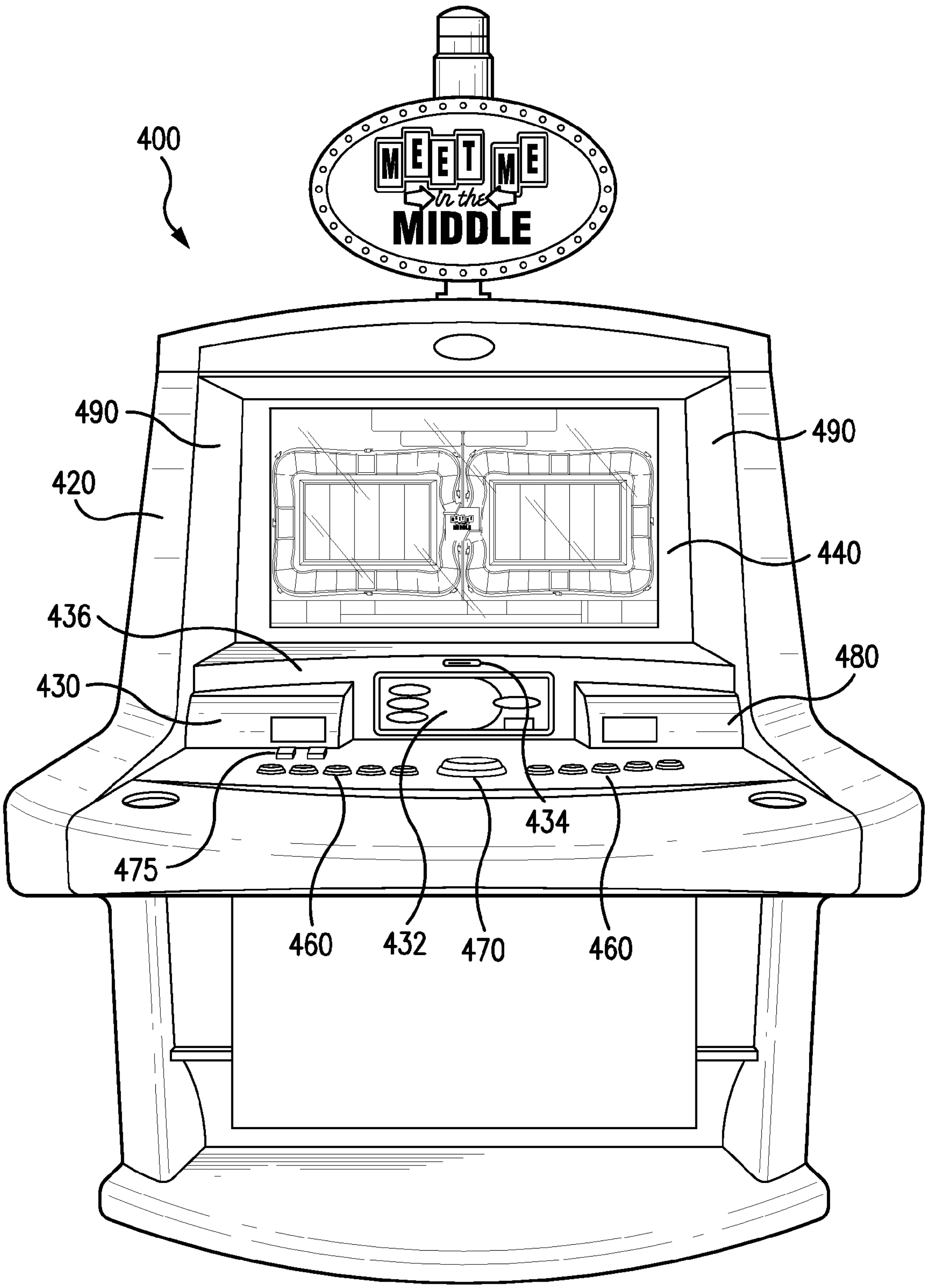
FIG. 4 is a perspective view of a gaming machine in accordance with one or more embodiments.

In accordance with one embodiment, the players initiate game play by selecting an amount to wager on their respective games (Game 1 and Game 2) by way of one of five wager amount buttons (25 credits per line, 50 credits per line, 75 credits per line, 100 credits per line 125 credits per line or 125 credits per line), as illustrated by FIG. 4, 460. A wager must be made on both games, however wager amounts may differ between games. The amount wagered on each game is displayed in game bet meters 162 and 164. The cumulative amount wagered on both games is displayed on bet meter 160. The bet meters may display a credit amount wagered, a cash amount wagered or both. In some embodiments, the players may select less than all pay lines, a different number of credits wagered on each line, etc. using buttons similar to those of FIG. 4, 460 on gaming machine 400 (FIG. 4) or touch screen buttons which perform the same functions. One player presses a SPIN button (FIG. 4, 470) and reels 101-105 and 121-125 are made to spin and stop in predetermined stop positions. A determination is then made whether the stop positions of the reels resulted in a winning game outcome for either Game 1, Game 2 or both.

In accordance with one embodiment of the invention, the players may view a pay table 200, as illustrated by FIG. 2B, associated with the reel games by way of a help or similar button (not shown). In alternate embodiments, pay table 200 may be presented on a second video or printed display attached to the gaming device. A winning combination, for example, might be three or more symbols adjacent to one another on an active pay line. For each winning combination, the game device pays the award in the pay table, adjusted as necessary based on the number of credits wagered on the pay line on which the win occurred. For example, three JACKPOT symbols 210 adjacent to one another from left-to-right on an active pay line might pay 50 times the amount wagered on the game.

In some embodiments, various primary game outcomes may be utilized to trigger the play of a feature game, including, but not limited to, awarding feature play when certain symbols appear on a pay line, when certain symbols are scattered, when no symbols of a certain type appear, when a certain winning combination occurs or, regardless of the visible symbols, at random or fixed intervals. The availability of the feature game may be restricted based on the size of the cumulative wager.

In accordance with one or more embodiments of the invention, a wagering game utilizes two different sets of reels 101-105; 121-125 with two separate "board games", Game One 115 and Game Two 135 displayed around each reel set 101-105 and 121-125 respectively. Various outcomes of spins of the two sets of reels cause a token 114; 134 on each of the respective game boards 115; 135 to advance to different positions 112; 132 on their boards. At least some of the board positions 112; 132 are associated with prizes which may be won. At least one board location 150 is common to both boards. When both tokens land on location 150, a common feature game is triggered.

While the experience for the players is of two separate base games, the overall game may be implemented as one game, similar to multi-hand poker. As shown above, the two reel sets are identical and use the same pay table structure. All reels, indicia and weights of indicia on the reels may be identical between the two games. The artwork colors may vary between the two games, otherwise the games may be the same. The presentation of two base games creates a community game atmosphere for the players while the implementation employs game mechanics commonly found in single-player multi-hand poker or blackjack games such as a single bet meter, single credit meter, money-in and out mechanisms, etc. For example, when two players sit down to play, they decide how much money to place on credit meter 155 (FIG. 1). Similarly, any wins are combined on single win paid meter 140. It is also possible for a single player to play both games simultaneously.

In accordance with one embodiment of the invention, entitled Meet Me In the Middle, the reels include "advance" symbols 116; 136 that serve to move each games's token 114; 134 around the board in a clockwise direction. Each board game includes blank locations 112; 132 and award locations with a "Middle Jackpot" location 150 shared between the two boards. There are two types of awards, individual awards and simultaneous awards.

In accordance with one embodiment or the invention, FIG. 2C, individual awards occur when one token lands on an award location at the end of a spin. The current embodiment exhibits three types of individual awards, 2 times total win 118; 138, 3 times total win 119; 139, and mystery awards 120; 140. The 2 and 3 times total win awards multiply the total award won on that players' side. Note that it is possible for the qualifying base game to have no winning outcome and therefore receive no award despite the token having landed on the award location. Examples of mystery awards include, but are not limited to, 2-, 3-, 4-, or 5-times total win, 2- or 3-times total bet, or automatic advancement of both tokens 114; 134 to Middle Jackpot location 150 or another location. In one embodiment, once a token has landed on an individual award location, the same individual award will not be awarded again in the case that on the next spin following an individual award, the token does not advance. In alternate embodiments, the individual award may be awarded repeatedly if the token does not advance.

As shown by FIG. 2D, in accordance with one embodiment, simultaneous awards occur when both tokens land on like award locations. There are two types of simultaneous awards: "Free Games" and the "Middle Jackpot." In accordance with one embodiment, a simultaneous award is not awarded again should neither token 114; 134 advance so the tokens remain on the same like award locations. In alternate embodiments, the simultaneous awards may be awarded repeatedly until one of the tokens 114; 134 advances.

As illustrated by FIG. 1 and FIG. 2E in accordance with one embodiment of the invention, free games may be awarded when both tokens 114; 134 land on a "Free Game" location 117; 137 at the end of a reel spin. This may include the case in which one token was previously on a "Free Game" 117; 137 location and did not advance while the second token 114; 134 advanced and landed on a "Free Game" location 117; 137.

Referring again to FIGS. 1 and 2D, in accordance with one embodiment of the invention, the "Middle Jackpot" feature is similarly awarded when both tokens land on the common "Middle Jackpot" location 150 at the end of a reel spin. This may include the case in which one token was previously on the "Middle Jackpot" location 150 and did not advance while the other token 114; 134 advanced and landed on the "Middle Jackpot" location 150.

In accordance with one or more embodiments, FIG. 3 further illustrates various aspects of the "Middle Jackpot" feature introduced in FIG. 2D above. The feature is awarded when both tokens reside on a common "Middle Jackpot" location (FIG. 1, 150) at the end of a reel spin. In one or more embodiments, play of the "Middle Jackpot" feature game may require a minimum individual or cumulative wager on each game. Both players (or a single player) are presented with a matrix 310; 320 from which each may pick four masked-award locations. The players take turns revealing their respective awards until all eight selected awards 331-338 have been displayed. The displayed award values are summed for each side and displayed in bonus win meters 340 and 350. Both awards are then posted to credit meter 155 (FIG. 1) and normal game play resumes.

The simultaneous and individual awards above serve as examples; other kinds of bonuses may be available to the players as either simultaneous or individual awards. Additional awards might include, but are not limited to, wild reels, traditional pick-a-tile bonuses, alternate base games, poker games, keno games, roulette games, wheel games and the like.

In accordance with one or more embodiments of the invention, progressive prizes may be awarded as part of primary or feature game play. The progressive prizes may be calculated by a progressive controller such as a controller manufactured by Mikohn, Inc. The progressive controller monitors wagering during base game play, calculates a current value for one or more progressive jackpot pools and transmits the current pool values to the gaming machine. In one or more embodiments, progressive awards are accumulated during regular play as a percentage, such as three percent, of the game play take. The prizes may be sized according to the preferences of the casino operator. The number of prizes may vary without deviating from the scope of the invention. The size of the prizes is dependent on the amount of play prior to initiating feature play and may come from the contributions of a single gaming machine or a number of linked gaming machines. In another aspect, the prizes may be set amounts established by the casino operator from non-coin-in funds, such as marketing funds.

In one or more embodiments, the prizes for feature game play may be accumulated based on funding mechanisms other than a percentage of wagers accumulated by the gaming machine. For example, an operator may initially fund various award pools with a pre-determined amount of money, such as $1000 for one progressive, $500 for a second progressive, $100 for a third progressive and so on. Subsequently, the casino operator may determine to increase the amounts of one or more of the awards at pre-determined times which may be periodically or randomly selected with a range of times or periods. Once a winner has occurred at any level, the award levels may be rolled back to the initial funding level. In one or more embodiments, only the winning award level is rolled back to the initial funding level.

In one or more embodiments, the prizes for feature game play may be set amounts, i.e. non-progressive. In one or more embodiments, the algorithms to determine the amounts may be determined by a statistical percentage based on an average take of a gaming machine and the likelihood of the win over a period of time. In the case where one or more gaming machines are networked, a common award table may be utilized where the award algorithms are determined based on an average take (total wagers) of all the networked gaming machines and the likelihood of a win of an award over a period of time. Each award may be calculated in a similar manner based on the likelihood of a winning outcome being achieved during a game play session.

Referring to FIG. 4, gaming machine 400 is shown, in accordance with one or more embodiments, including cabinet housing 420, game display 440 upon which a primary game, one or more feature games and multiple progressives awards that may be won during play of the games, player-activated wagering buttons 460, spin button 470, player tracking panel 436, bill/voucher acceptor 480 and one or more speakers 490. Cabinet housing 420 may be a self-standing unit and may be manufactured with reinforced steel or other rigid materials which are resistant to tampering and vandalism. Cabinet housing 420 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 400 or thin client capability such as that incorporating some of the capability of a remote server.

In one or more embodiments, cabinet housing 420 houses a processor, circuitry, and software (not shown) for receiving signals from the player-activated wagering buttons 460 and spin button 470, operating the games, and transmitting signals to the respective displays and speakers. Any shaped cabinet may be implemented with any embodiment of gaming machine 400 so long as it provides access to the players for playing a game. For example, cabinet housing 420 may comprise a slant-top, bar-top, or table-top style cabinet, including a Bally Cinevision™ or CineReels™ cabinet. The operation of gaming machine 400 is described more fully below.

A plurality of other player-activated buttons 475 may be used for various functions such as, but not limited to, selecting a wager denomination, selecting a game to be played, selecting a wager amount per game, initiating a game, or cashing out money from gaming machine 400. Player-activated buttons 475 may be operable as input mechanisms and may include mechanical buttons, electromechanical buttons or touch screen buttons. Optionally, a handle (not shown) may be rotated by a player to initiate a game.

In one or more embodiments, player-activated wagering buttons 460, spin button 470 and player-activated buttons 475 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to wager per game.

Player tracking panel 436 includes player tracking card reader 434 and player tracking display 432. Voucher printer 430 may be integrated into player tracking panel 436 or installed elsewhere in cabinet housing 420, for example, as shown.

Game display 440 may present a game of chance wherein one or more players receive one or more outcomes from a set of potential outcomes. For example, one such game of chance is a video slot machine game. In other aspects of the invention, gaming machine 400 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the players. In video/mechanical or pure video embodiments, game display 440 is, typically, a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 440 preferably includes a touch screen or touch glass system (not shown) and presents player interfaces such as, but not limited to, credit meter (FIG. 1, 155), win meter (FIG. 1, 140) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference.

Game display 440 may also present information such as, but not limited to, player information, advertisements and casino promotions, graphic displays, news and sports updates, or even offer an alternate game. This information may be generated through a host computer networked with gaming machine 400 on its own initiative or it may be obtained by request of the players using either one or more of the plurality of player-activated buttons 475; the game display itself, if game display 440 comprises a touch screen or similar technology; buttons (not shown) mounted about game display 440 which may permit selections such as those found on an ATM machine, where legends on the screen are associated with respective selecting buttons; or any player input device that offers the required functionality.

Cabinet housing 420 incorporates a single game display 440. However, in alternate embodiments, cabinet housing 420 may house one or more additional displays or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 5A:
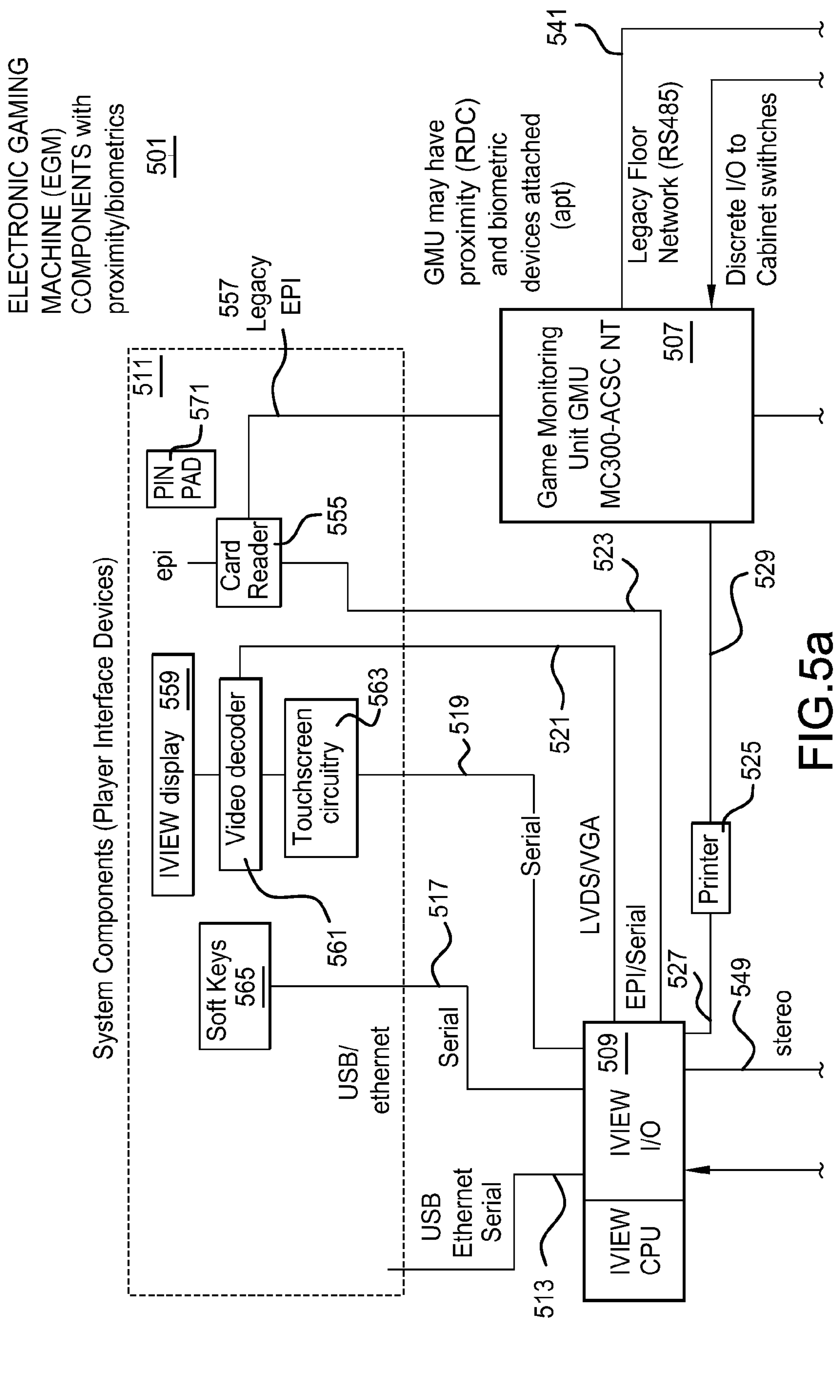
FIG. 5 is a block diagram of the physical and logical components of the gaming machine of FIG. 4 in accordance with one or more embodiments.
Figure 5B:
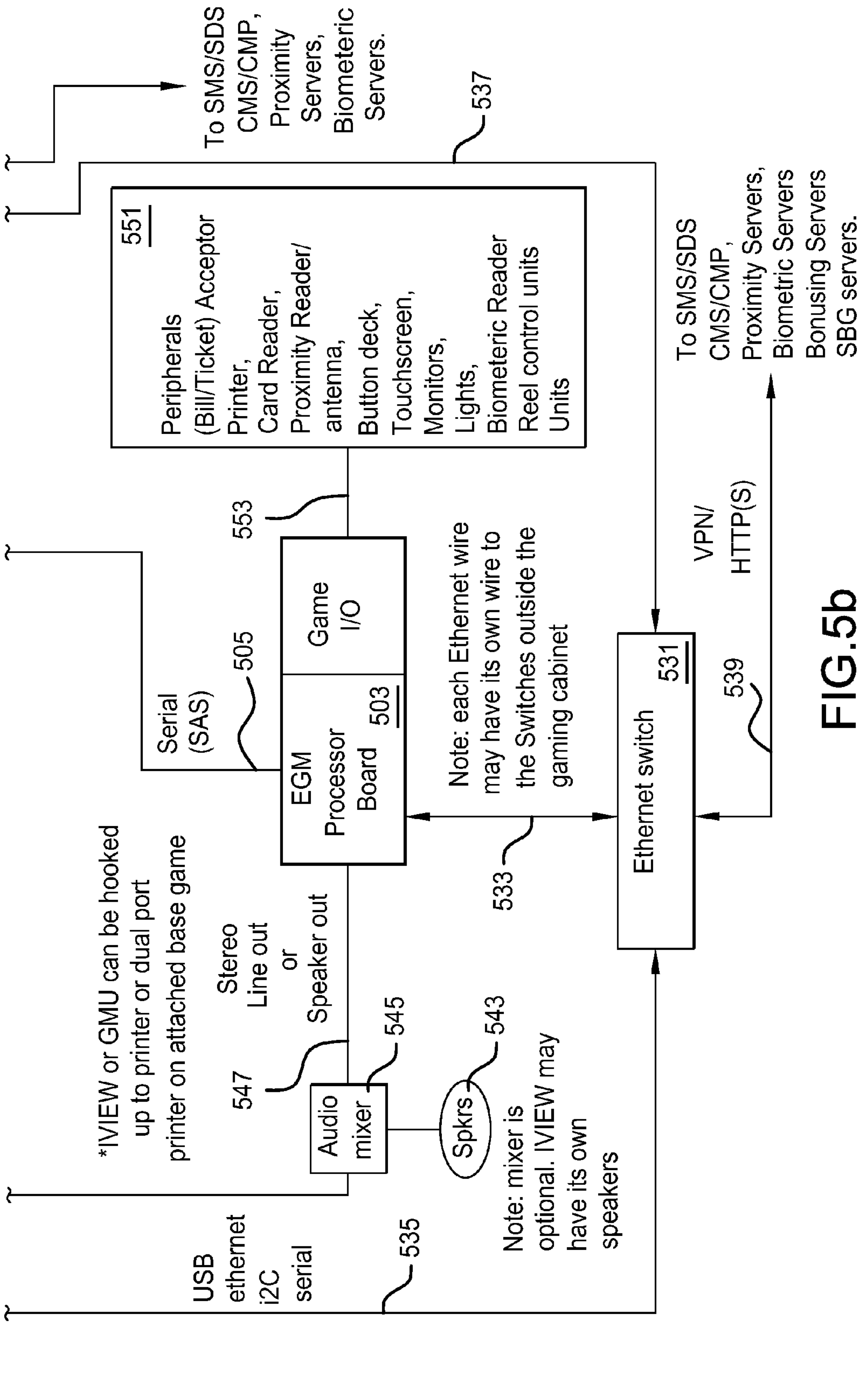

Referring to FIG. 5, gaming machine 501 is shown in accordance with one or more embodiments. gaming machine 501 includes gaming machine processor board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. Gaming machine processor board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to gaming machine processor board 503 and PIB 509. The proximity and biometric devices and circuitry may be installed by upgrading a commercially available PIB 509, such as a Bally iView unit. Coding executed on gaming machine processor board 503, PIB 509, and/or GMU 507 may be upgraded to integrate a game having a two-player slot machine game having one or more shared feature games as is more fully described herein.

Peripherals 551 connect through bus line 553 to gaming machine processor board 503. For example, a bill/ticket acceptor is typically connected to a game input-output board 553 which is, in turn, connected to a conventional central processing unit ("CPU") gaming machine processor board 503, such as an Intel Pentium microprocessor mounted on a gaming motherboard. I/O board 553 may be connected to gaming machine processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS gaming machine processor board 503 executes a game program that causes gaming machine processor board 503 to play a game. In one embodiment, the game program provides a two-player slot machine game having one or more shared feature games. The various components and included devices may be installed with conventionally and/or commercially available components, devices, and circuitry into a conventionally- and/or commercially available gaming machine cabinet, examples of which are described above.

When a player or players have inserted a form of currency such as, for example and without limitation, paper currency, coins or tokens, cashless tickets or vouchers, electronic funds transfers or the like into the currency acceptor, a signal is sent by way of I/O board 553 to gaming machine processor board 503 which, in turn, assigns an appropriate number of credits for play in accordance with the game program. The player(s) may further control the operation of the gaming machine by way of other peripherals 551, for example, to select the amount to wager via electromechanical or touch screen buttons. The game starts in response to a player operating a start mechanism such as a handle or touch screen icon. The game program includes a random number generator to provide a display of randomly selected indicia on one or more displays. In some embodiments, the random generator may be physically separate from gaming machine 400; for example, it may be part of a central determination host system which provides random game outcomes to the game program. Thereafter, the players may or may not interact with the game through electromechanical or touch screen buttons to change the displayed indicia. Finally, gaming machine processor board 503 under control of the game program and OS compares the final display of indicia to a pay table. The set of possible game outcomes may include a subset of outcomes related to the triggering of a feature game. In the event the displayed outcome is a member of this subset, gaming machine processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from gaming machine processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus line 541. Gaming activity information may be transferred by the gaming machine processor board 503 to GMU 507 where the information may be translated into a network protocol, such as S2S, for transmission to a server, such as a player tracking server, where information about a player's playing activity may be stored in a designated server database. In one or more embodiments, despite the two-player aspects of the game, only one player's activity may be tracked due to the single platform nature of gaming machine 501 such as single bet/win meters and a single card reader 555 connected to GMU 507.

All reporting to the player tracking server is consistent with standard single game video play. Since the game described above processes a single total wager and credits a single total win, reporting to the server is similar to the operation of a single machine multi-hand poker game.

PIB 509 includes an integrated circuit board, PID processor, and memory which includes an operating system, such as Windows CE, a player interface program which may be executable by the PID processor together with various input/output (I/O) drivers for respective devices which connect to PIB 509, such as player interface devices 511, and which may further include various games or game components playable on PIB 509 or playable on a connected network server and PIB 509 is operable as the player interface. PIB 509 connects to card reader 555 through bus line 523, display 559 through video decoder 561 and bus line 521, such as an LVDS or VGA bus.

As part of its programming, the PID processor executes coding to drive display 559 and provide messages and information to the players. Touch screen circuitry interactively connects display 559 and video decoder 561 to PIB 509, such that a player may input information and cause the information to be transmitted to PIB 509 either on the player's initiative or responsive to a query by PIB 509. Additionally soft keys 565 connect through bus line 517 to PIB 509 and operate together with display 559 to provide information or queries to a player and receive responses or queries from the player. PIB 509, in turn, communicates over the CMS/SMS network through Ethernet switch 531 and bus lines 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iVIEW processing board and game monitoring unit (GMU) processing board. The GMU and iVIEW can combined into one like the commercially available Bally GTM iVIEW device. This device may have a video mixing technology to mix the EGM processor's video signals with the iVIEW display onto the top box monitor or any monitor on the gaming device.

Figure 6:
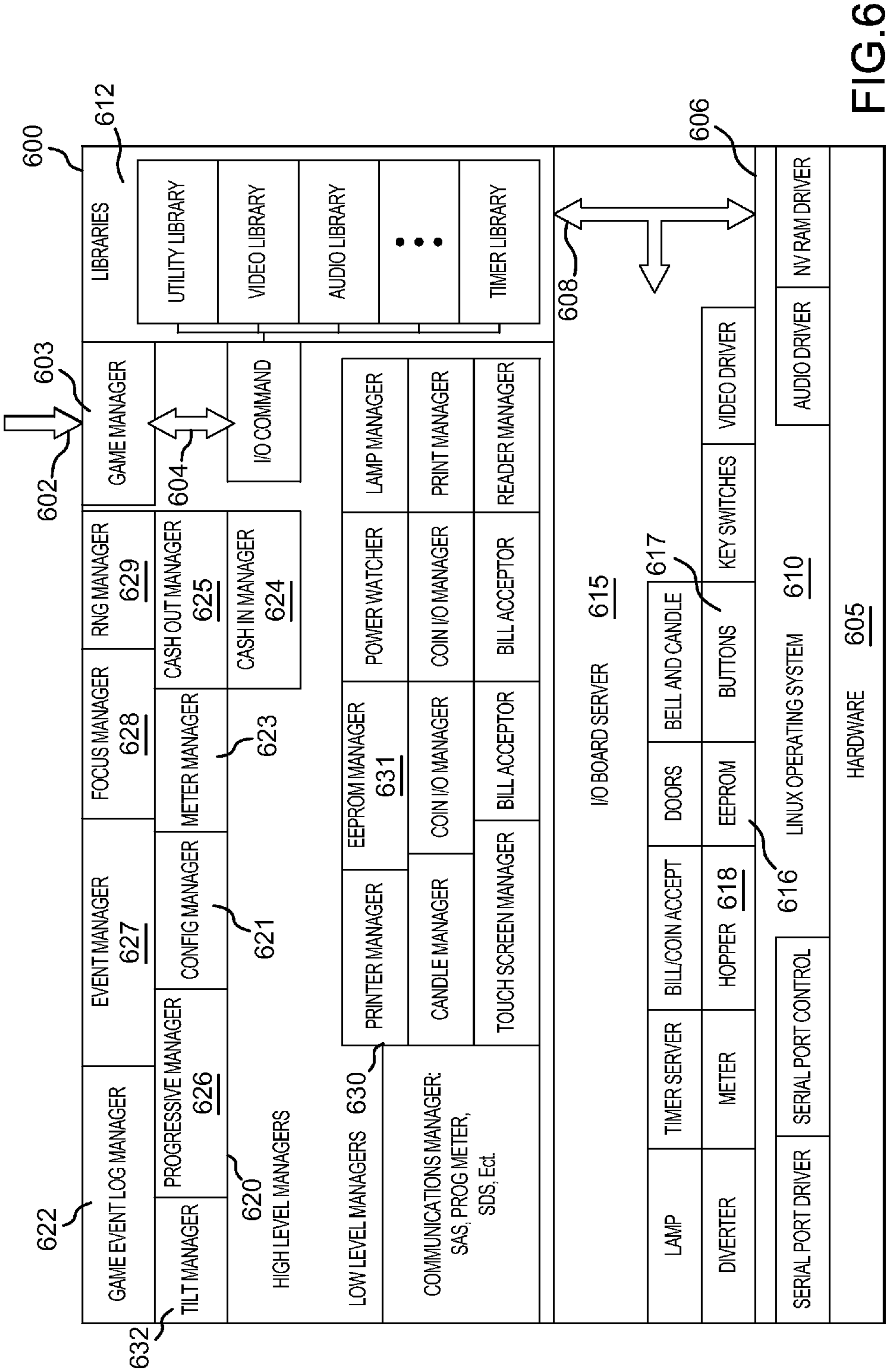
FIG. 6 is a block diagram of the logical components of a gaming kernel in accordance with one or more embodiments.

In accordance with one or more embodiments, FIG. 6 is a functional block diagram of a gaming kernel 600 of a game program under control of gaming machine processor board 503. The game program uses gaming kernel 600 by calling into application programming interface (API) 602, which is part of game manager 603. The components of game kernel 600 as shown in FIG. 6 are only illustrative, and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a operating system layer 610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 600 executes at the user level of the operating system layer 610, and itself contains a major component called the I/O board server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O board server 615 (see arrow 608). A few specific drivers remain in operating system layer 610's kernel, shown as those below line 606. These are built-in, primitive, or privileged drivers that are (i) general (ii) kept to a minimum and (iii) are easier to leave than extract. In such cases, the low-level communications is handled within operating system layer 610 and the contents passed to library routines 612.

Thus, in a few cases library routines may interact with drivers inside operating system layer 610, which is why arrow 608 is shown as having three directions (between library routines 612 and I/O board server 615, or between library routines 612 and certain drivers in operating system layer 610). No matter which path is taken, the logic needed to work with each device is coded into modules in the user layer of the diagram. operating system layer 610 is kept as simple, stripped down, and common across as many hardware platforms as possible. The library utilities and user-level drivers change as dictated by the game cabinet or game machine in which it will run. Thus, each game cabinet or game machine may have an industry standard processor board 503 connected to a unique, relatively dumb, and as inexpensive as possible I/O adapter board 540, plus a gaming kernel 600 which will have the game-machine-unique library routines and I/O board server 615 components needed to enable game applications to interact with the gaming machine cabinet. Note that these differences are invisible to the game application software with the exception of certain functional differences (i.e., if a gaming cabinet has stereo sound, the game application will be able make use of API 602 to use the capability over that of a cabinet having traditional monaural sound).

Game manager 603 provides an interface into game kernel 600, providing consistent, predictable, and backwards compatible calling methods, syntax, and capabilities by way of game application API 602. This enables the game developer to be free of dealing directly with the hardware, including the freedom to not have to deal with low-level drivers as well as the freedom to not have to program lower level managers 630, although lower level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started; configuration manager 621 has data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger; that is, it is not aware of the contents of logged messages and events. The game event log manager's (622) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash in (624) and cash out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like game event log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, etc. that may generate errors. Random number generator manager 629 is provided to allow easy programming access to a random number generator (RNG), as a RNG is required in virtually all casino-style (gambling) games. Random number generator manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations. During play, a game application may post a cash out event through the event manager 627 (the same way all events are handled), and using a callback posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there will typically be event messages being sent back and forth between the device and cash out manager 625 until the dispensing finishes, after which cash out manager 625, having updated the credit manager and any other game state (such as some associated with meter manager 623) that needs to be updated for this set of actions, sends a cash out completion event to event manager 627 and to the game application thereby. Cash in manager 624 functions similarly to cash out manager 625, only controlling, interfacing with, and taking care of actions associated with cashing in events, cash in devices, and associated meters and crediting.

In a further example, in accordance with one or more embodiments, I/O board server 615 may write data to the gaming machine EEPROM memory, which is located in the gaming machine cabinet and holds meter storage that must be kept even in the event of power failure. Game manager 603 calls the I/O library functions to write data to the EEPROM. The I/O board server 615 receives the request and starts a low priority EEPROM thread 616 within I/O board server 615 to write the data. This thread uses a sequence of 8 bit command and data writes to the EEPROM device to write the appropriate data in the proper location within the device. Any errors detected will be sent as IPC messages to game manager 603. All of this processing is asynchronous.

In accordance with one embodiment, button module 617 within I/O board server 615, polls (or is sent) the state of buttons every 2 ms. These inputs are debounced by keeping a history of input samples. Certain sequences of samples are required to detect a button was pressed, in which case the I/O board server 615 sends an inter-process communication event to game manager 603 that a button was pressed or released. In some embodiments, the gaming machine may have intelligent distributed I/O which debounces the buttons, in which case button module 617 may be able to communicate with the remote intelligent button processor to get the button events and simply relay them to game manager 603 via IPC messages. In still another embodiment, the I/O library may be used for pay out requests from the game application. For example, hopper module 618 must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 7:
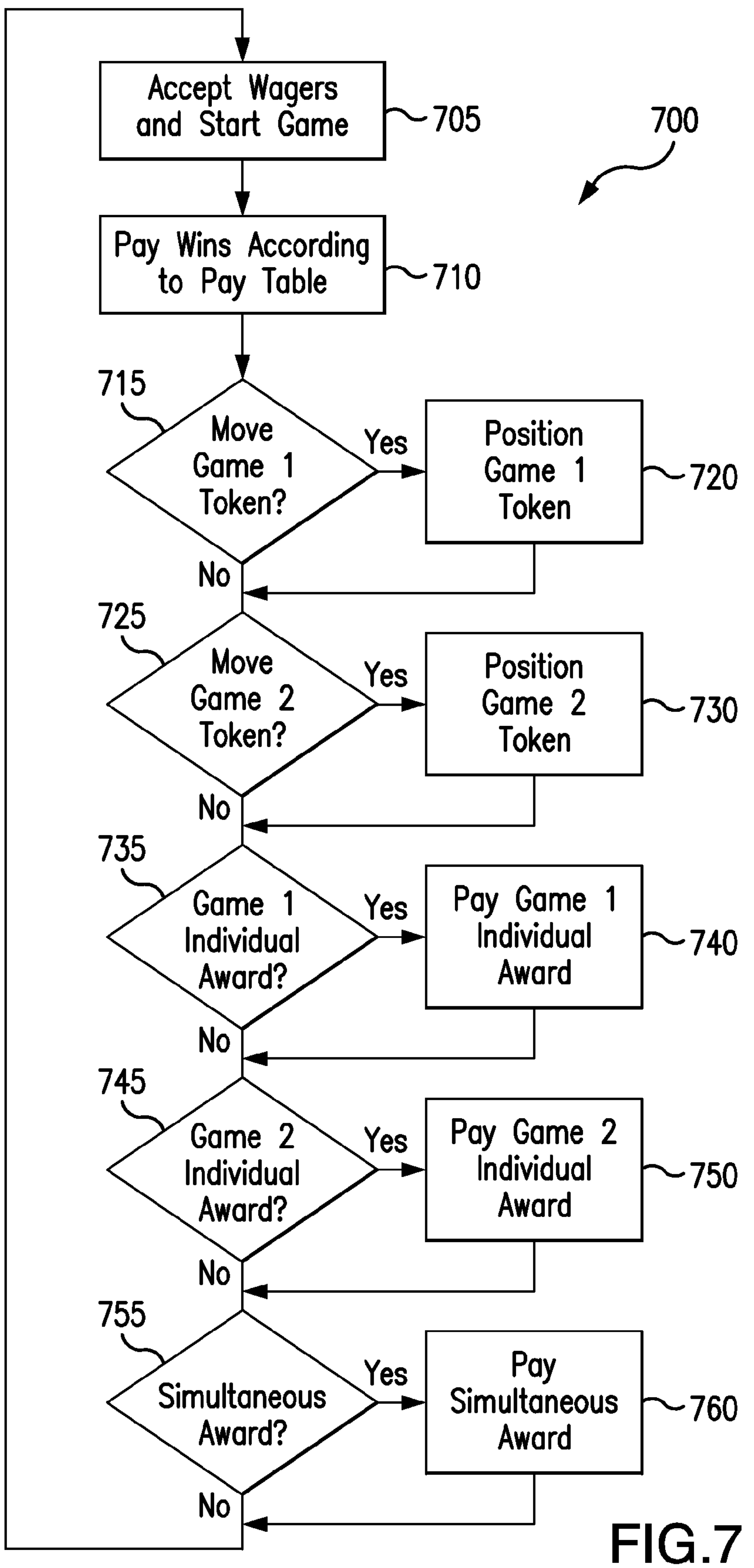
FIG. 7 is a functional block diagram depicting the steps associated with carrying out an example method in accordance with one or more embodiments.

A logical flow diagram generally depicting the steps associated with a method 700 for carrying out a game in accordance with one aspect of the invention is presented in FIG. 7. The order of actions as shown in FIG. 7 is only illustrative, and should not be considered limiting. For example, the order of the actions may be changed, additional steps may be added or some steps may be removed without deviating from the scope and spirit of the invention.

First at box 705, the game accepts a wager from each of two players and starts the game, whereby a random stop position for each of the reels is determined by way of the random number generator. Each set of reels corresponding to a first game and a second game displays a representation of a slot machine reel spin before stopping with particular indicia displayed to the players. Any possible winning combinations on the first game are evaluated and paid according to the amount wagered on the first game. Any possible winning combinations on the second game are evaluated and paid according to the amount wagered on the second game. A win occurs if a series of indicia (three or more JACKPOT symbols, for example) appears on one or more pay lines or scattered, as described above, and the players may be paid for any winning symbol combinations at box 710.

At diamond 715, it is determined whether the outcome displayed by the set of reels corresponding to the first game indicates that a token associated with the first game should move on a game board associated with the first game. If so, the token is positioned on the board associated with the first game at box 720.

In either case, flow continues at diamond 725, where it is determined whether the outcome displayed by the set of reels corresponding to the second game indicates that a token associated with the second game should move on a game board associated with the second game. If so, the token is positioned on the board associated with the second game at box 730.

In either case, flow continues at diamond 735, where it is determined whether the position of the first game's token indicates an individual award has been won by the first game. If so, the award is paid at box 740. In some cases, the paying award includes repositioning the token associated with the first game on the game board associated with the first game.

In either case, flow continues at diamond 745, where it is determined whether the position of the second game's token indicates an individual award has been won by the second game. If so, the award is paid at box 750. In some cases, paying the award may include repositioning the token associated with the second game on the game board associated with the second game.

In either case, flow continues at diamond 755, where it is determined whether the position of the first and second games' tokens indicate a simultaneous award has been won by the first and second games. If so, the simultaneous award is "paid" at box 760. In some cases, paying the simultaneous award may include play of one or more feature games, as described above.

In either case, normal play resumes at box 705.

Figure 8A:
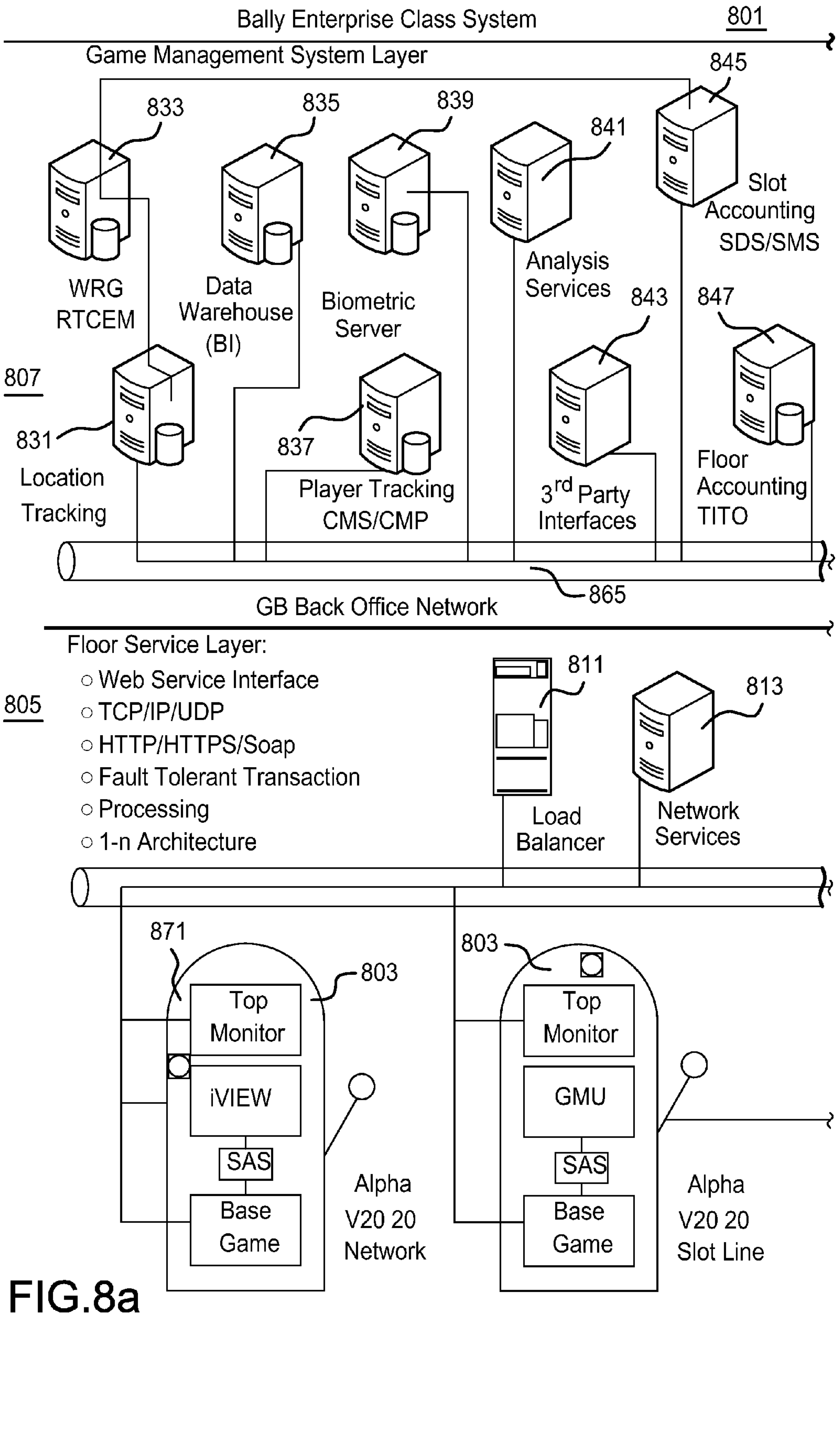
FIG. 8 is a schematic block diagram showing the hardware elements of a networked gaming system in accordance with one or more embodiments.
Figure 8B:
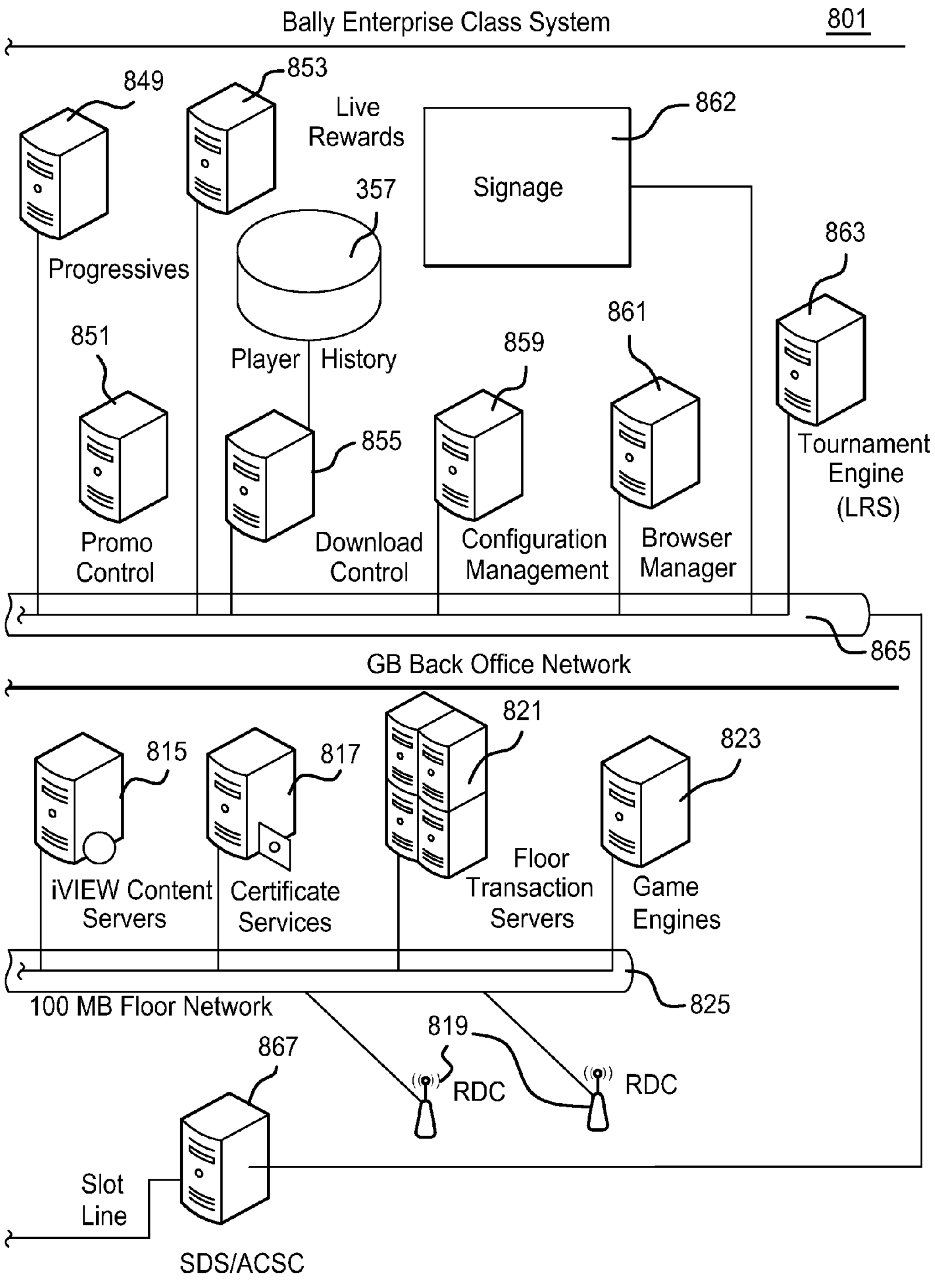

Referring to FIG. 8, enterprise gaming system 801 is shown in accordance with one or more embodiments. Enterprise gaming system 801 may include one casino or multiple locations and generally includes a network of gaming machines 803, floor management system (SMS) 805, and casino management system (CMS) 807. SMS 805 may include load balancer 811, network services servers 813, player interface (iVIEW) content servers 815, certificate services server 817, floor radio dispatch receiver/transmitters (RDC) 819, floor transaction servers 821 and game engines 823, each of which may connect over network bus 825 to gaming machines 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming machines 803. The various servers and gaming machines 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 803 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 807 and/or SMS 805 servers and devices, firmware, media, operating systems, and configurations may be downloaded to the system components of respective gaming machines for upgrading or managing floor content and offerings in accordance with operator selections or automatically depending upon CMS 807 and SMS 805 master programming. The data and programming updates to gaming machines 803 are authenticated using conventional techniques prior to install on the system components.

In various embodiments, any of the gaming machines 803 may be a mechanical reel spinning slot machine, video slot machine, video poker machine, keno machine, video blackjack machine, or a gaming machine offering one or more of the above described games including a multi-player game wherein a common game board display is connected to multiple single-player machines that communicate their base game outcomes to the common game board display in order to position their tokens on game boards associated with each machine. Individual and simultaneous awards triggered as described above can then be enjoyed in a community gaming atmosphere and credited to the individual machines as various bonus games are played and wins occur. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled "Networked System and Method for Group Play Gaming," filed on Nov. 9, 2007, which is hereby incorporated by reference in its entirety for all purposes.

Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine playable by two players comprising:
a processor;
a first game under control of the processor comprising a first plurality of indicia-bearing reels and a first game board comprising a plurality of locations,
the first plurality of reels operable to display a first outcome comprising a random display of their indicia,
a first token positionable at one of the plurality of locations of the first game board in response to the first outcome;
a second game under control of the processor comprising a second plurality of indicia-bearing reels and a second game board comprising a plurality of locations,
the second plurality of reels operable to display a second outcome comprising a random display of their indicia,
a second token positionable at one of the plurality of locations of the second game board in response to the second outcome;
wherein the first game board and the second game board share a common location;
wherein the first game is playable by a first of the two players and the second game is playable by a second of the two players; and wherein one or more feature games shared by both the first player and the second player may only be triggered when both the first token and the second token are simultaneously in the common location.

2. The gaming machine of claim 1 wherein at least one of the plurality of locations of the first and second game boards comprises an associated award.

3. The gaming machine of claim 2 wherein the award comprises an individual prize.

4. The gaming machine of claim 2 wherein the award comprises a simultaneous award.

5. The gaming machine of claim 2 wherein the award comprises a multiplier.

6. The gaming machine of claim 2 wherein the award comprises positioning a token positioned at the at least one of the plurality of locations to a different location.

* * * * *